United States Patent
Asai et al.

(10) Patent No.: US 7,828,266 B2
(45) Date of Patent: Nov. 9, 2010

(54) COMPRESSED AIR TAKING OUT APPARATUS

(75) Inventors: Masatoshi Asai, Tokyo (JP); Jun Inagaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 394 days.

(21) Appl. No.: 11/988,014

(22) PCT Filed: Jun. 14, 2006

(86) PCT No.: PCT/JP2006/311897

§ 371 (c)(1),
(2), (4) Date: Dec. 28, 2007

(87) PCT Pub. No.: WO2007/000892

PCT Pub. Date: Jan. 4, 2007

(65) Prior Publication Data

US 2009/0166571 A1    Jul. 2, 2009

(30) Foreign Application Priority Data

Jun. 29, 2005   (JP) .............................. 2005-190416

(51) Int. Cl.
*F16L 37/28* (2006.01)
(52) U.S. Cl. .................................. 251/149.9; 251/149.6
(58) Field of Classification Search ............. 251/149.1, 251/149.3, 149.6, 149.7, 149.9
See application file for complete search history.

(56) References Cited

U.S. PATENT DOCUMENTS

| 2,279,146 | A | | 4/1942 | Schneller |
| 4,150,673 | A | * | 4/1979 | Watt ........................... 604/408 |
| 5,074,524 | A | * | 12/1991 | Wade ....................... 251/149.6 |
| 6,279,874 | B1 | * | 8/2001 | Nyberg ..................... 251/149.6 |
| 6,883,542 | B2 | * | 4/2005 | Kuraguchi et al. .......... 137/613 |
| 2004/0124390 | A1 | | 7/2004 | Schneller et al. |

FOREIGN PATENT DOCUMENTS

| GB | 2 077 872 A | 12/1981 |
| JP | 2002-266768 | 9/2002 |
| JP | 2002-340266 | 11/2002 |
| JP | 2003-090480 | 3/2003 |
| JP | 2003-97448 | 4/2003 |

* cited by examiner

*Primary Examiner*—John K Fristoe, Jr.
(74) *Attorney, Agent, or Firm*—Drinker Biddle & Reath LLP

(57) ABSTRACT

A valve body of each of low and high-pressure couplers is urged in a close direction in to a supply side of a partition. A stem that penetrates through an opening portion and projects into the receive side is connected to the valve body. A cylinder portion is formed on the receive side of the partition. A locking mechanism is provided in a vicinity of an end portion of the cylinder portion. A movable sleeve having an annular projecting portion is provided on an inside of the cylinder portion. Each of low and high-pressure plugs has an annular projecting surface that can engage with the annular projecting portion, a flange that engages with an end portion of the cylinder portion, and an engaging portion that can engage with the locking mechanism.

4 Claims, 8 Drawing Sheets

COMPRESSED AIR TAKING OUT APPARATUS

TECHNICAL FIELD

The present invention relates to a compressed air taking out apparatus that includes high-pressure and low-pressure couplers and high-pressure and low-pressure plugs in such a manner that the high-pressure plug can be connected to both couplers but the low-pressure plug can be connected only to the low-pressure coupler.

BACKGROUND ART

As a use of a high-pressure gas can be accepted pursuant to an amendment of the High Pressure Gas Control Law, a pressure range used in a tool powered by a compressed air is gradually shifted to a high pressure side. If a high-pressure compressed air can be utilized, high energy can be obtained even though the tool itself is compact. Thereby, it is possible to provide a light and easy-handle tool. Also, in a nailing machine as the compressed air-powered tool, a need of nailing to a hard material such as glued lamination board SVL, LVL, and the like, is increasing, so that higher energy is required in the tool. In the compressed air-powered tool in the prior art, the highest working pressure is set to a low pressure of below 0.98 MPa or a high pressure of 2.94 MPa or less. However, the compressed air-powered tool having a super high pressure of 4 to 4.2 MPa or less as a highest working pressure in the specification appeared. Because of the above convenience of high pressure, it may be considered that the highest working pressure is increased up to 5 MPa or less in future.

In the prior art, a dedicated compressed air-powered tool is used for every pressure band. A common air compressor capable of supplying the compressed air in both low-pressure and high-pressure having a pressure reducing valve is provided with a low-pressure coupler and a high-pressure coupler. The compressed air-powered tool having the low-pressure plug is connected to the low-pressure coupler, while the compressed air-powered tool having the high-pressure plug is connected to the high-pressure coupler.

In JP-A-2003-090480, a compressed air taking out apparatus capable of supplying the compressed air at both a low pressure and a high pressure is disclosed.

When a super high pressure compressed air taking out apparatus for an architectural purpose is implemented in future, the super high-pressure compressor and the compressed air-powered tool dedicated for the super high pressure purpose must be simultaneously supplied to the market. That is, in addition to the low-pressure and high-pressure equipments, the super high pressure compressor and the super high pressure compressed air-powered tool are simultaneously supplied to the market.

However, supposed that the compressor and the compressed air-powered tool are exchanged all together for the super high pressure compressor and the compressed air-powered tool dedicated for the super high pressure purpose, not only a production cost on the maker side and a burden of expense on a purchaser side are increased but also the low-pressure equipments are scrapped all at once. Therefore, this situation is not preferable from an aspect of environmental protection.

Also, end equipments such as the air tool, the auxiliary tank, etc. can be satisfactorily used in a state that their working pressure bands overlap with each other. More particularly, for example, in such a particular condition that the nailing machine hits a nail a length of which is half of a maximum usable length of a nail, the super high pressure air tool can be used in the high-pressure working band of 1.5 MPa. Also, the high-pressure air tool can be used in the low-pressure working band of 1 MPa or less.

DISCLOSURE OF THE INVENTION

In order to enable a user and a maker to gradually deal with an increase of the super high pressure, one or more embodiments of the present invention provide a compressed air taking out apparatus for making it possible that a device that can be used in a higher pressure band can be connected to an equipment such as an air compressor whose supply pressure is low to ensure a safety.

In accordance with one or more embodiments of the invention, a compressed air taking out apparatus is provided with a low-pressure coupler, a high-pressure coupler, and a plug. Each of the low-pressure coupler and the high-pressure coupler includes: a partition that partitions a supply side from which a compressed air is supplied and a receive side to which the compressed air is fed; a valve body for opening/closing a opening portion of the partition, arranged in the supply side of the partition, and urged in a direction to close the opening portion; a stem provided on the valve body and protruding to the receive side through the opening portion; a cylinder portion formed on the receive side of the partition; a locking mechanism provided in a vicinity of an end portion of the cylinder portion and for stopping a movement of the plug; and a movable sleeve provided on an inside of the cylinder portion, having a projection portion on an inner surface, and capable of sliding in an axial direction. The plug includes: a projecting surface that is capable of engaging with the projection portion; and an engaging portion that is capable of engaging with the locking mechanism.

In the compressed air taking out apparatus, a distance between the locking mechanism and a top end of the stem in the high-pressure coupler may be larger than a distance between the locking mechanism and a top end of the stem in the low-pressure coupler.

In the compressed air taking out apparatus, a distance between the locking mechanism and the projection portion of the movable sleeve in the high-pressure coupler may be larger than a distance between the locking mechanism and the projection portion of the movable sleeve in the low-pressure coupler.

In the compressed air taking out apparatus, the plug may have a flange that is capable of engaging with an end portion of the cylinder portion, and a distance between the locking mechanism and an end portion of the cylinder portion in the high-pressure coupler may be larger than a distance between the locking mechanism and an end portion of the cylinder portion in the low-pressure coupler.

According to one or more embodiments of the present invention, the low-pressure coupler and the low-pressure plug and the high-pressure coupler and the high-pressure plug are connected mutually. Also, when the high-pressure plug is fitted into the low-pressure coupler, the top end of the small diameter portion of the high-pressure plug pushes the stem of the low-pressure coupler. This is because a length of the small diameter portion of the high-pressure plug is sufficiently long. Therefore, the feeding of the compressed air is performed. In contrast, when the worker tries to connect the low-pressure plug to the high-pressure coupler, the top end of the small diameter portion of the low-pressure plug cannot sufficiently push the stem of the high-pressure coupler. This is because a length of the small diameter portion of the low-pressure plug is set short. In this case, the feeding of compressed air is not performed.

Also, in the situation that a distance between the locking mechanism of the high-pressure coupler and the projection portion of the movable sleeve is set larger than a distance between the locking mechanism of the low-pressure coupler and the projection portion of the movable sleeve, when the low-pressure plug is fitted into the low-pressure coupler, when the high-pressure plug is fitted into the high-pressure coupler, and when the high-pressure plug is fitted into the low-pressure coupler, the plug can be connected to the coupler. On the contrary, only when the low-pressure plug is fitted into the high-pressure coupler, the movable sleeve cannot be sufficiently pushed in. Therefore, the locking mechanism is still held in the lock release position, and the low-pressure plug cannot be locked by the locking mechanism. As a result, the low-pressure plug cannot be connected to the high-pressure coupler.

Also, in the situation that a distance between the locking mechanism of the high-pressure coupler and an end portion of the cylinder portion is set larger than a distance between the locking mechanism of the low-pressure coupler and the end portion of the cylinder portion, when the low-pressure plug is fitted into the low-pressure coupler, when the high-pressure plug is fitted into the high-pressure coupler, and when the high-pressure plug is fitted into the low-pressure coupler, the plug can be connected to the coupler. On the contrary, only when the low-pressure plug is fitted into the high-pressure coupler, the low-pressure plug cannot be locked by the locking mechanism. As a result, the low-pressure plug cannot be connected to the high-pressure coupler.

Therefore, the equipment used in the high-pressure or super high pressure band can be connected to the existing air supply source such as the air compressor, or the like, which is used in the low-pressure or high-pressure band. As a result, the equipment can deal gradually with an increase of the high-pressure in such a way that only the connection equipments for the high-pressure or super high pressure use are prepared for the present and then the air supply source for the high-pressure or super high pressure use is also prepared.

In addition, only when the low-pressure plug is fitted into the high-pressure coupler, the plug cannot be connected to the coupler. Therefore, the security can also be ensured.

Other aspects and advantages of the invention will be apparent from the following description and the appended claims.

Figure 1A:
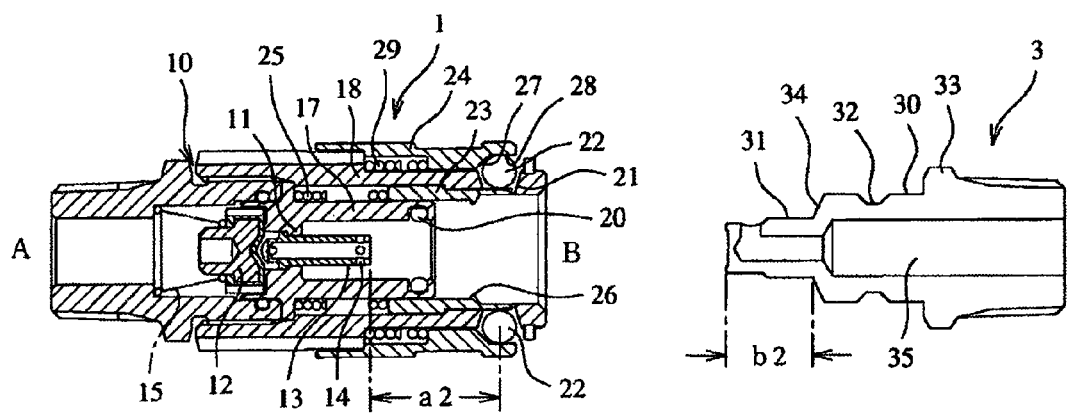
FIG. 1(a) A view showing a low-pressure coupler and a low-pressure plug according to a first exemplary embodiment of the present invention.

DESCRIPTION OF REFERENCE NUMERALS 1, 2, 5, 7 coupler
3, 4, 6, 8 plug
12 valve body
13 stem
22 locking mechanism

BEST MODE FOR CARRYING OUT THE INVENTION

Exemplary embodiments of the present invention will be explained with reference to the drawings hereinafter.

First Exemplary Embodiment

Figure 1B:
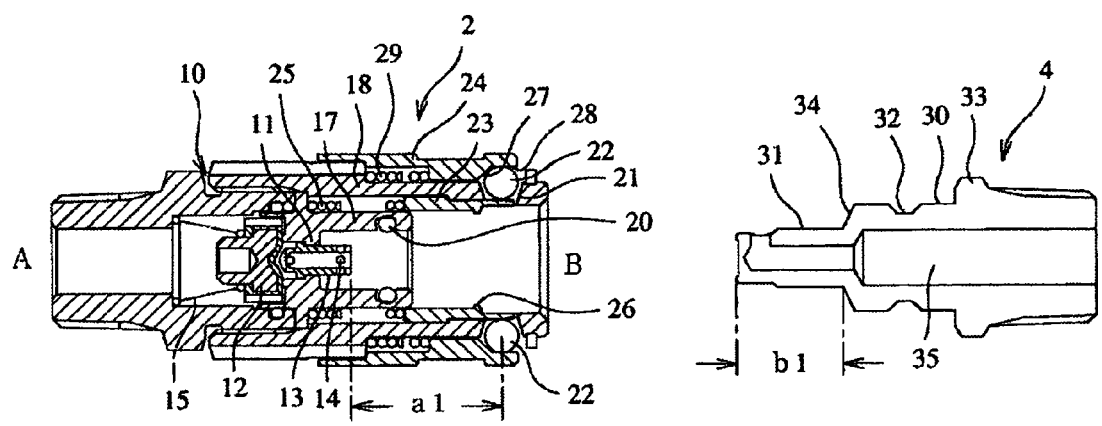
FIG. 1(b) A view showing a high-pressure coupler and a high-pressure plug of the first exemplary embodiment of the present invention.
Figure 2A:
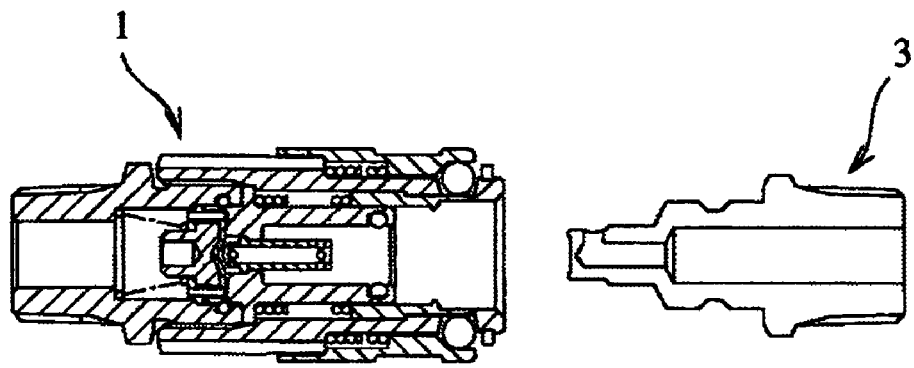
FIG. 2(a) An explanatory view of a fitting mode when the low-pressure plug is fitted into the low-pressure coupler of the first exemplary embodiment.
Figure 2B:
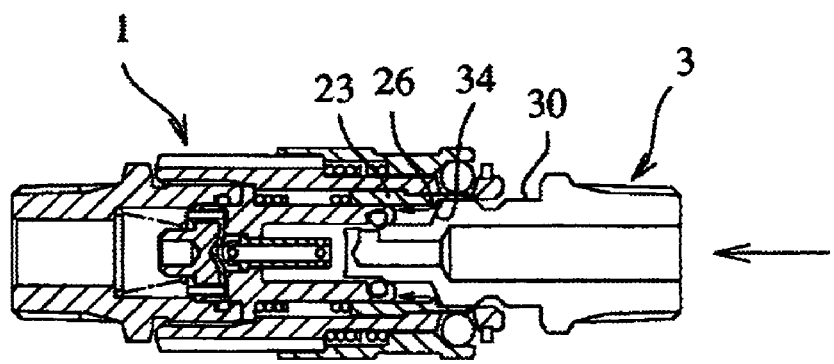
FIG. 2(b) An explanatory view of a fitting mode when the low-pressure plug is fitted into the low-pressure coupler of the first exemplary embodiment.
Figure 2C:
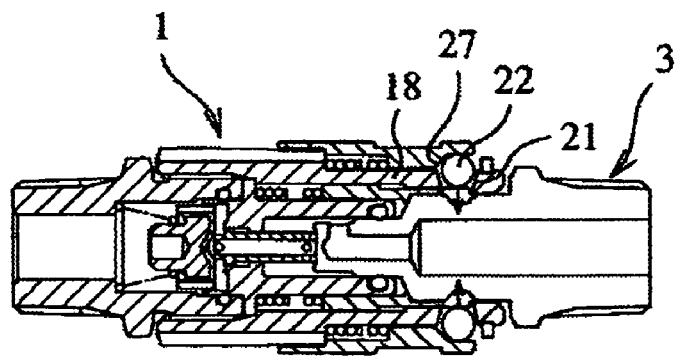
FIG. 2(c) An explanatory view of a fitting mode when the low-pressure plug is fitted into the low-pressure coupler of the first exemplary embodiment.
Figure 2D:
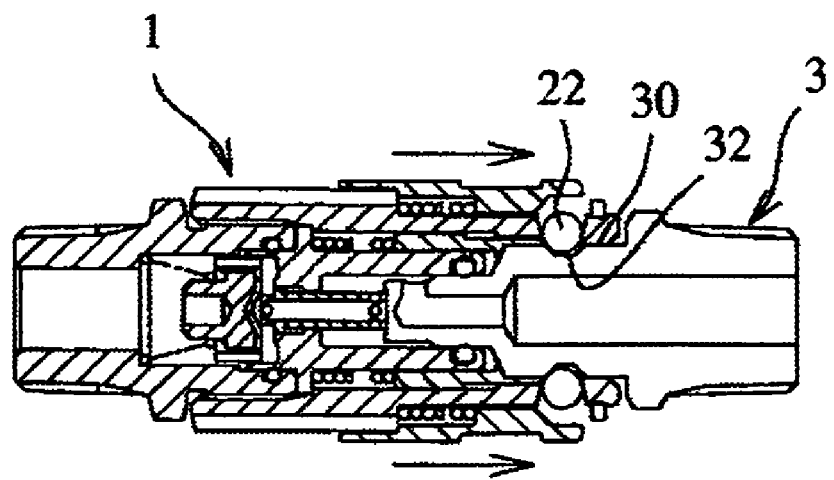
FIG. 2(d) An explanatory view of a fitting mode when the low-pressure plug is fitted into the low-pressure coupler of the first exemplary embodiment.
Figure 2E:
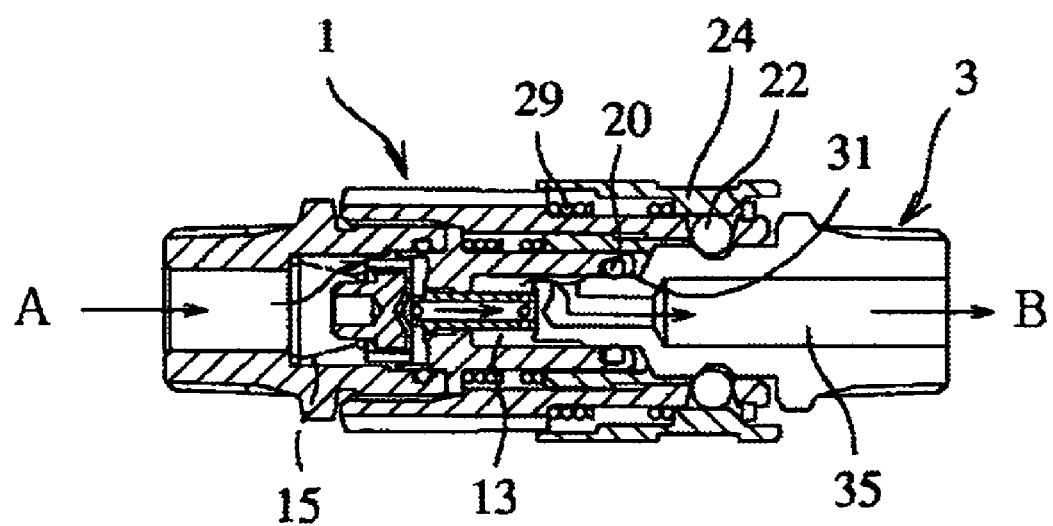
FIG. 2(e) An explanatory view of a fitting mode when the low-pressure plug is fitted into the low-pressure coupler of the first exemplary embodiment.

FIG. 1(a) and FIG. 1(b) show a system equipped with two couplers for low-pressure and high-pressure couplers and two plugs for low-pressure and high-pressure plugs respectively as a compressed air taking out apparatus according to a first exemplary embodiment of the present invention. A reference numeral 1 is a low-pressure coupler, 2 is a high-pressure coupler, 3 is a low-pressure plug, and 4 is a high-pressure plug. The couplers 1, 2 are provided to an air supply source such as an air compressor, or the like, and the plugs 3, 4 are connected to a connecting equipment such as the nailing machine, or the like via an air hose.

Now, the low pressure and the high pressure mentioned herein are relative values. Therefore, if one is the high pressure and the other is the super high pressure, one (high pressure) is represented as the low pressure and the other (super high pressure) is represented as the high pressure.

The basic structure of the couplers 1, 2 are similar to each other. A valve body 12 is arranged in a middle portion of a coupler main body 10 on the supply side A of a partition 11. This partition 11 is formed to partition the supply side A that supplies the compressed air and the receive side B that receives the compressed air. The valve body 12 is opened and closed by pushing in and pulling out the plugs 3, 4 that are inserted from the receive side B.

That is, an opening portion is formed in a center portion of the partition 11. A stem 13 is coupled integrally to a center portion of the valve body 12. This stem 13 passes through the opening portion and protrudes toward the receive side B of the partition 11. The stem 13 is formed in a tubular shape, and a through hole 14 is formed laterally on both sides. A bottom portion of the valve body 12 is formed by the sealing member such that the opening portions and the stem 13 can be opened and closed. The bottom portion is urged by a spring 15 to shut always the opening portion and seals an inside. Therefore, the compressed air supplied to the air supply source from the couplers 1, 2 is not discharged and accumulated therein. When the stem 13 is pushed from the receive side B to release the sealing of the valve body 12, the compressed air is supplied to the receive side B through the stem 13.

In this case, the stem 13 may be formed in a solid shape, and the compressed air may be passed through a space between the stem 13 and the opening portion.

Also, the valve body 12 and the stem 13 are formed as a separate body respectively. But the valve body 12 and the stem 13 may formed integrally.

A short cylinder portion 17 is formed on the receive side B of the partition 11, and also a cylinder portion 18 is formed on the outside of this short cylinder portion 17. The cylinder portion 18 protrudes ahead of the short cylinder portion 17 to the receive side B. The stem 13 is arranged in an interior of the short cylinder portion 17. A sealing 20 is provided in a position that is a slightly inner side of the end portion of the short cylinder portion 17 on the receive side B. Also, a plurality of through holes 21 are formed on a peripheral surface in positions that are a slightly inner side near the end portion of the cylinder portion 18. A spherical locking mechanism 22 for stopping movement of the plugs 3, 4 is arranged in respective through holes 21 respectively.

A movable sleeve 23 is provided on the inside of the cylinder portion 18 to slide in an axial direction. Also, a cylinder body 24 is provided on the outside of the cylinder portion 18 to slide in an axial direction. Both the movable sleeve 23 and the cylinder body 24 are urged by springs 25, 29 to move to the receive side B beyond the through holes 21 of the cylinder portion 18. The movable sleeve 23 is arranged between the cylinder portion 18 and the short cylinder portion 17. An annular projecting portion 26 is formed on its inner surface in the intermediate portion. Clearance portions 28 for the spherical locking mechanisms 22 are formed on the end portion of the cylinder body 24 via an oblique guiding surface 27. In an initial state, the cylinder body 24 is pushed against a spring force of the spring 29, while the movable sleeve 23 pushes out the locking mechanisms 22 and moves them in the clearance portions 28 on the cylinder body 24.

The plugs 3, 4 have the similar basic configurations to those of the couplers 1, 2. A large diameter portion 30 fitted into the cylinder portion 18 of each of the couplers 1, 2 and a small diameter portion 31 fitted into the short cylinder portion 17 of each of the couplers 1, 2 are formed. An annular projecting surface 34 that engages with the annular projecting portion 26 is formed between the large diameter portion 30 and the small diameter portion 31. In this case, partial projecting portions may be formed in place of the annular projecting portion 26 to engage with the annular projecting surface 34. An annular groove engaging portion 32 is formed on an intermediate portion of the large diameter portion 30, and a flange 33 that engages with an end portion of the cylinder portion 18 is formed on the end portion. A top end of the short cylinder portion 17 is arranged to oppose to the stem 13 of each of the couplers 1, 2. An air supply path 35 is formed in the center area of each of the plugs 3, 4. A top end of the air supply path 35 is branched in the radial direction at an angle of 120°, and is opened to the outside surface.

Then, in the low-pressure coupler 1 and the high-pressure coupler 2, a distance $a_1$ from the locking mechanisms 22 of the high-pressure coupler 2 to the end portion of the stem 13 is set larger than a distance $a_2$ in the same position of the low-pressure coupler 1.

Also, in the low-pressure plug 3 and the high-pressure plug 4, in response to difference of the above distances, a length $b_1$ of the small diameter portion 31 of the high-pressure plug 4 is set longer than a length $b_2$ of the small diameter portion 31 of the low-pressure plug 3.

In the above combinational system, when the low-pressure plug 3 is connected to the low-pressure coupler 1, as shown in FIGS. 2(*a*), 2(*b*), first the annular projecting surface 34 at the top end of the large diameter portion 30 of the plug engages with the annular projecting portion 26 of the movable sleeve 23 to push this sleeve into the inner side. Then, as shown in FIG. 2(*c*), the through holes 21 of the cylinder portion 18 are opened, and the locking mechanisms 22 are caused to drop into the through holes 21 of the cylinder portion 18 along the oblique guiding surface 27 of the movable sleeve 23. When the low-pressure plug 3 is pushed further into the coupler, the locking mechanisms 22 engage with the engaging portion 32 of the large diameter portion 30. Thus, as shown in FIG. 2(*d*), the low-pressure plug 3 cannot be pushed further into the coupler. Simultaneously, the cylinder body 24 is pushed out by the spring 29 and, as shown in FIG. 2(*e*), the cylinder body 24 covers the locking mechanisms 22. Thus, an engaging state of the locking mechanisms 22 is locked. At this time, the sealing 20 of the low-pressure coupler 1 contacts an outer peripheral surface of the short cylinder portion 17 to make a sealing whereas the top end of the low-pressure plug 3 pushes out the stem 13 of the low-pressure coupler 1 against a spring force of the spring 15 to release a sealing. Therefore, the compressed air supplied to the coupler passes through the air supply path 35 of the plug from the supply side A, and then is fed to the receive side B of the connection equipment from the air hose.

When the low-pressure plug 3 is removed from the low-pressure coupler 1, this plug may be pulled out by moving the cylinder body 24 toward the supply side A against a spring force of the spring 29.

Figure 3A:
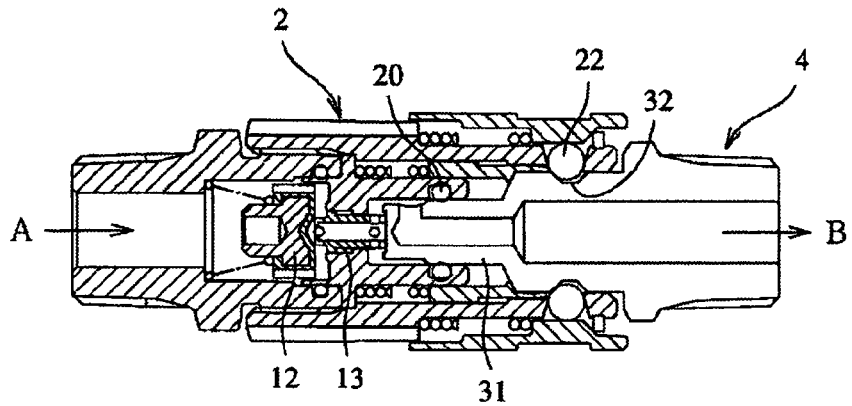
FIG. 3(a) A sectional view showing a coupling mode of the high-pressure coupler and the high-pressure plug of the first exemplary embodiment.

The fitting and releasing operations of other combinations are executed similarly. When the high-pressure plug 4 is connected to the high-pressure coupler 2, they are brought into a state shown in FIG. 3(a). The sealing of the valve body 12 is released, and the compressed air is fed from the supply side A to the receive side B.

Figure 3B:
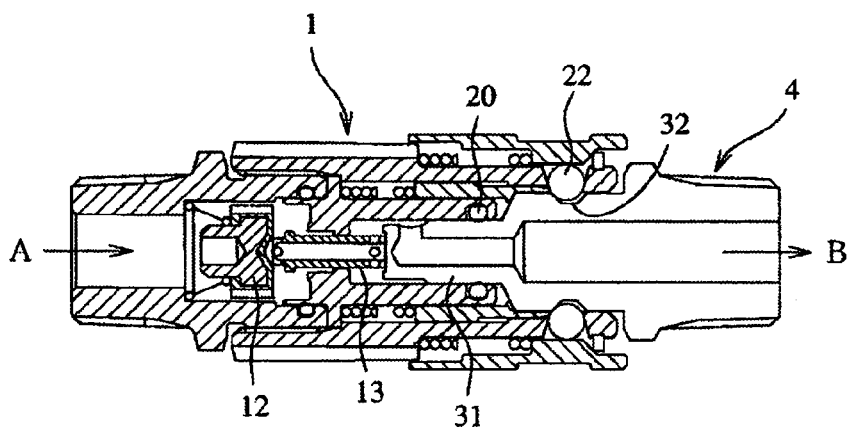
FIG. 3(b) A sectional view showing a coupling mode of the low-pressure coupler and the high-pressure plug of the first exemplary embodiment.

Also, as shown in FIG. 3(b), when the high-pressure plug 4 is fitted into the low-pressure coupler 1, the top end of the small diameter portion 31 of the high-pressure plug 4 pushes in the stem 13 of the low-pressure coupler 1. This is because a length of the small diameter portion 31 of the high-pressure plug 4 is set sufficiently long. Therefore, the feeding of the compressed air is performed.

Figure 3C:
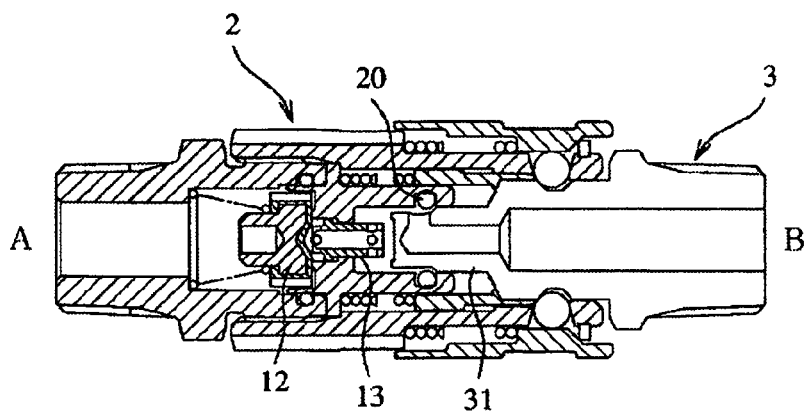
FIG. 3(c) A sectional view showing a coupling mode of the high-pressure coupler and the low-pressure plug of the first exemplary embodiment.

In contrast, as shown in FIG. 3(c), when the worker tries to connect the low-pressure plug 3 to the high-pressure coupler 2, the top end of the small diameter portion 31 of the low-pressure plug 3 cannot sufficiently push the stem 13 of the high-pressure coupler 2. This is because a length of the small diameter portion 31 of the low-pressure plug 3 is set short. Therefore, in this case, the feeding of compressed air is not performed.

As described above, according to the combinational system of the above compressed air taking out apparatus, when the plugs 3, 4 are fitted into the couplers 1, 2 belonging to the same pressure category respectively and when the high-pressure plug 4 is fitted into the low-pressure coupler 1, the plug can be connected to the coupler. On the contrary, only when the low-pressure plug 3 is fitted into the high-pressure coupler 2, the plug cannot be connected to the coupler. Therefore, the equipment used in the high-pressure or super high pressure band can be connected to the existing air supply source such as the air compressor, or the like, which is used in the low-pressure or high-pressure band. As a result, the equipment can deal gradually with an increase of the high-pressure in such a way that only the connection equipments for the high-pressure or super high pressure use are prepared for the present and then the air supply source for the high-pressure or super high pressure use is also prepared.

In addition, only when the low-pressure plug 3 is fitted into the high-pressure coupler 2, the plug cannot be connected to the coupler. Therefore, the high-pressure air is never supplied to the low-pressure air tool, and the security can be ensured.

Second Exemplary Embodiment

In a second exemplary embodiment, the combinational system of the compressed air taking out apparatus is constructed as follows, instead of replacement of the distances a1, a2 from the locking mechanism 22 of the couplers 1,2 to the end of the stem 13 and the lengths b1, b2 of the plugs 3, 4 in the first exemplary embodiment.

Also, in the second exemplary embodiment, the basic configurations of the couplers and the plugs are similar to the couplers 1, 2 and the plugs 3, 4 of the first exemplary embodiment. Therefore, the same reference symbols denote the same members, and the same member has the same function respectively even if the reference symbol and the explanation are omitted there.

Figure 4A:
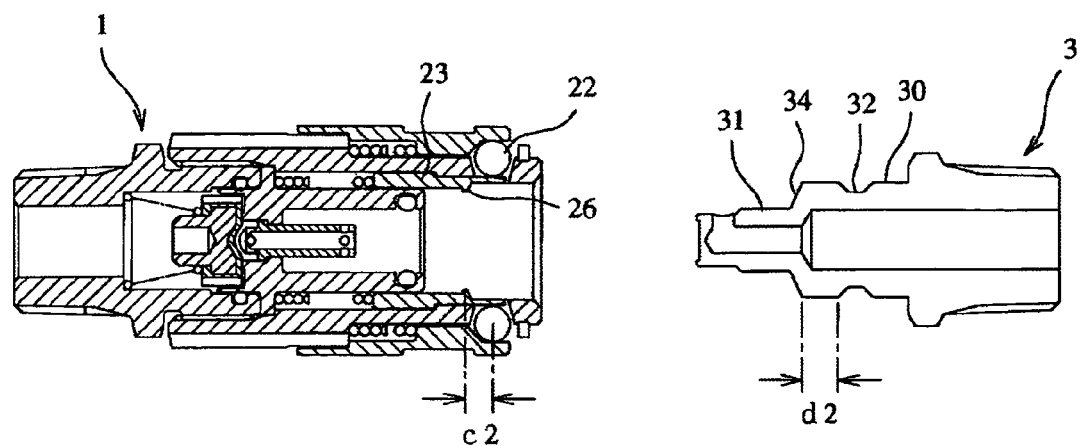
FIG. 4(a) A view showing a low-pressure coupler and a low-pressure plug according to a second exemplary embodiment of the present invention.
Figure 4B:
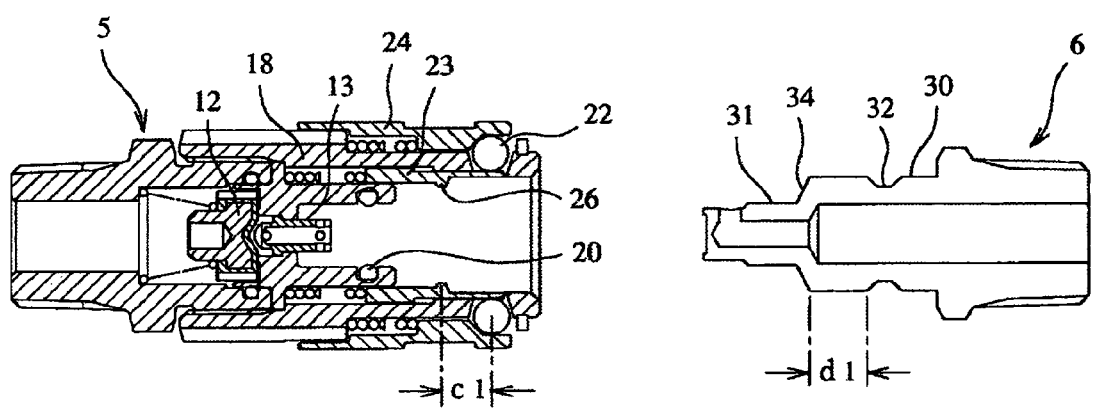
FIG. 4(b) A view showing a high-pressure coupler and a high-pressure plug of the second exemplary embodiment of the present invention.

FIG. 4(a) and FIG. 4(b) show the combinational system of the compressed air taking out apparatus according to the second exemplary embodiment. In FIG. 4(a) and FIG. 4(b), a distance c1 from the locking mechanism 22 of a high-pressure coupler 5 to the annular projecting portion 26 of the movable sleeve 23 is set larger than a distance c2 in the same portion of the low-pressure coupler 1. Also, a length d1 from the engaging portion 32 of the high-pressure plug 5 to the top end of the large diameter portion 30 is set longer than a length d2 in the same portion of the low-pressure plug 3 correspondingly.

Figure 5A:
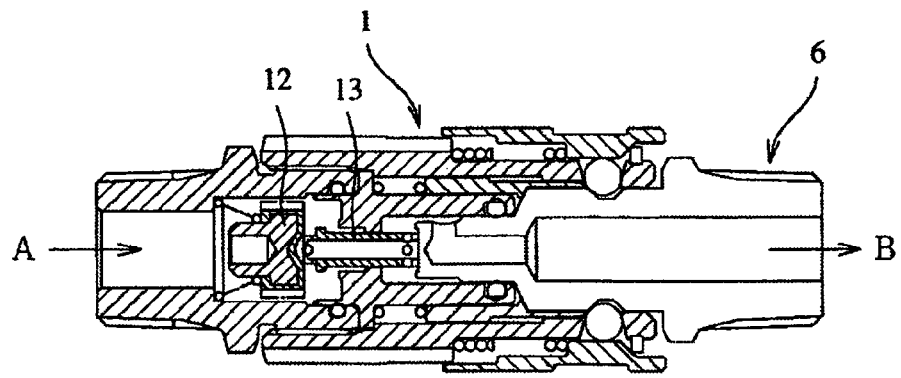
FIG. 5(a) A sectional view showing a coupling mode of the low-pressure coupler and the high-pressure plug of the second exemplary embodiment.
Figure 5B:
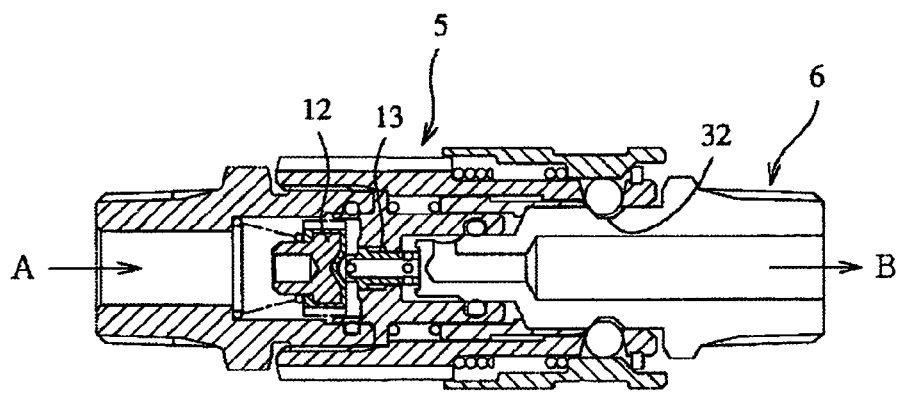
FIG. 5(b) A sectional view showing a coupling mode of the high-pressure coupler and the high-pressure plug of the second exemplary embodiment.

According to the above combinational system, when the low-pressure plug 3 is fitted into the low-pressure coupler 1 as shown in FIG. 2(a) to FIG. 2(e), when a high-pressure plug 6 is fitted into the low-pressure coupler 1 as shown in FIG. 5(a), and when the high-pressure plug 6 is fitted into the high-pressure coupler 5 as shown in FIG. 5(b), the plug can be connected to the coupler.

Figure 5C:
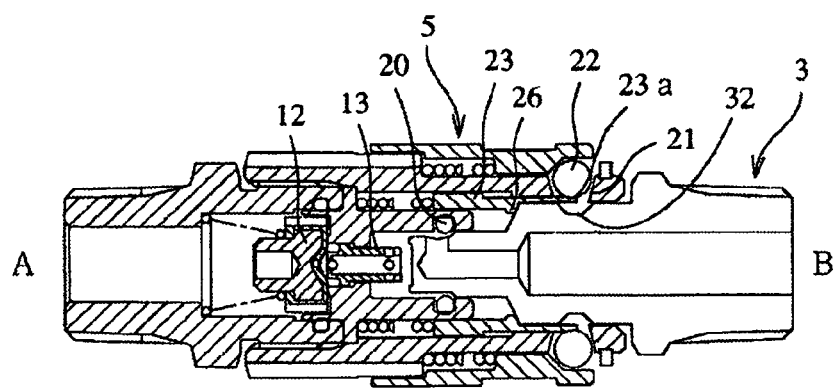
FIG. 5(c) A sectional view showing a coupling mode of the high-pressure coupler and the low-pressure plug of the second exemplary embodiment.

On the contrary, as shown in FIG. 5(c), only when the low-pressure plug 3 is fitted into the high-pressure coupler 5, the movable sleeve 23 cannot be sufficiently pushed in. Therefore, an end portion 23a of the movable sleeve can move merely in the middle of the through holes 21. As a result, the locking mechanism 22 cannot fall down into the inside of the engaging portion 32 and cannot lock the low-pressure plug 3, and thus the low-pressure plug 3 gets out easily of the high-pressure coupler. Hence, the low-pressure plug 3 cannot be connected to the high-pressure coupler 5. Also, since the top end of the low-pressure plug 3 cannot push in the valve body 12, the compressed air is not supplied.

Therefore, in the second exemplary embodiment, the same advantages as those of the first exemplary embodiment can also be achieved.

Third Exemplary Embodiment

Figure 6A:
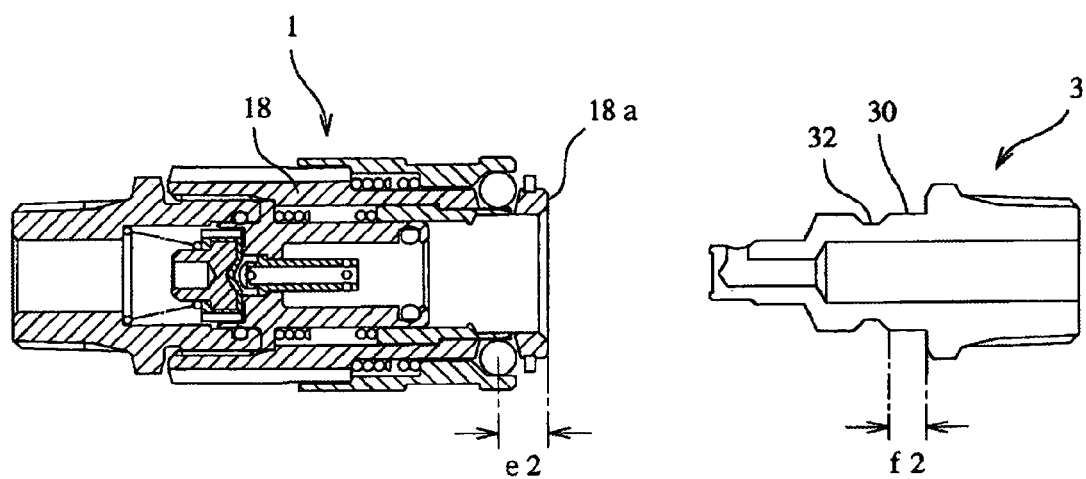
FIG. 6(a) A view showing a low-pressure coupler and a low-pressure plug according to a third exemplary embodiment of the present invention.
Figure 6B:
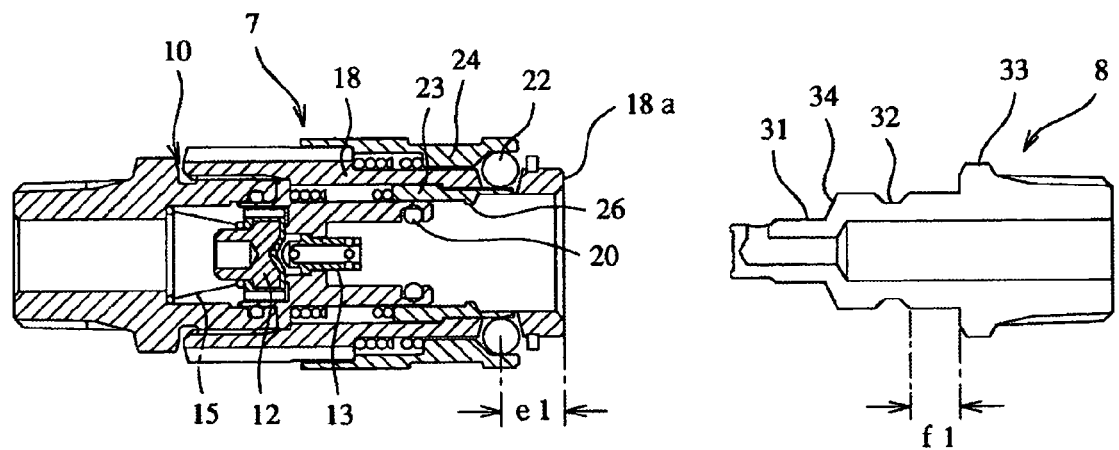
FIG. 6(b) A view showing a high-pressure coupler and a high-pressure plug according to the third exemplary embodiment of the present invention.

FIG. 6(a) and FIG. 6(b) showing the combinational system of the compresses air taking out apparatus according to a third exemplary embodiment of the present invention. A distance e1 from the locking mechanisms 22 of a high-pressure coupler 7 to an end portion 18a of the cylinder portion 18 is set larger than a distance e2 in the same portion of the low-pressure coupler 1. Also, a distance f1 from the engaging portion of a high-pressure plug 8 to the end portion of the large diameter portion 30 is set longer than a distance f2 in the same portion of the low-pressure plug 3.

Figure 7A:
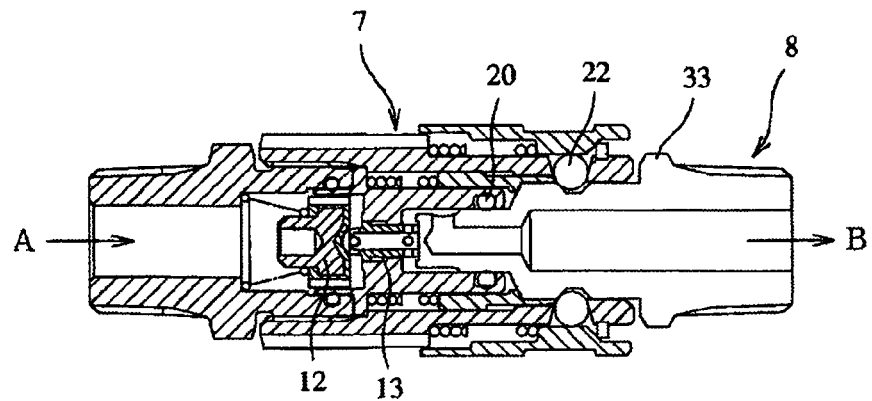
FIG. 7(a) A sectional view showing a coupling mode of the high-pressure coupler and the high-pressure plug of the third exemplary embodiment.
Figure 7B:
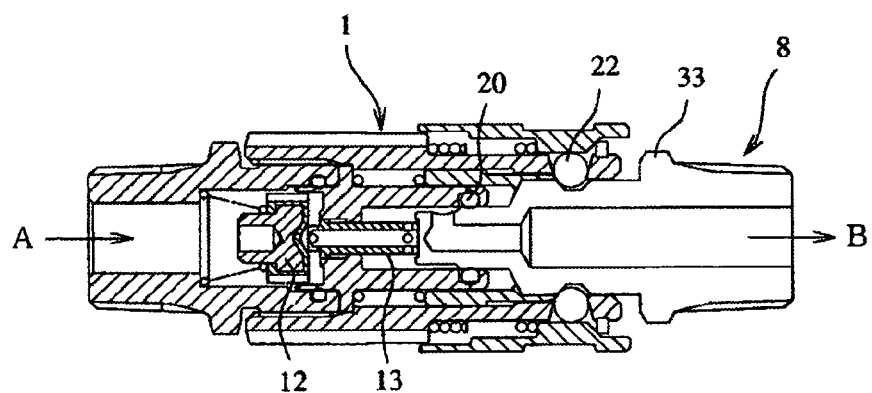
FIG. 7(b) A sectional view showing a coupling mode of the low-pressure coupler and the high-pressure plug of the third exemplary embodiment.

According to the above combinational system, when the low-pressure plug 3 is fitted into the low-pressure coupler 1 as shown in FIG. 2(a) to FIG. 2(e), when the high-pressure plug 8 is fitted into the high-pressure coupler 7 as shown in FIG. 7(a), and when the high-pressure plug 8 is fitted into the low-pressure coupler 1 as shown in FIG. 7(b, the plug can be connected to the coupler.

Figure 7C:
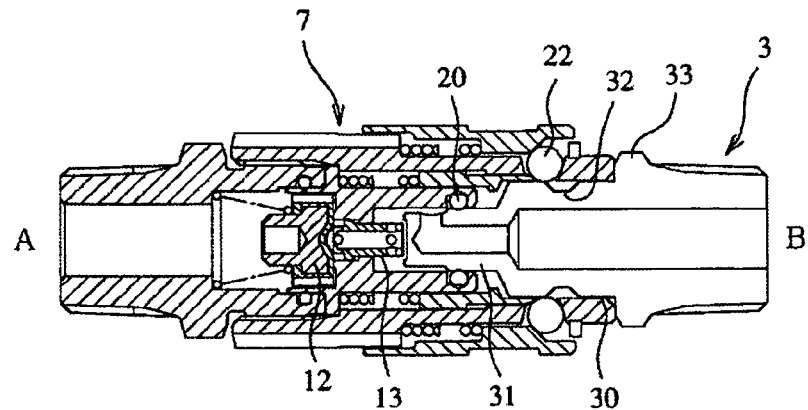
FIG. 7(c) A sectional view showing a coupling mode of the high-pressure coupler and the low-pressure plug of the third exemplary embodiment.

On the contrary, as shown in FIG. 7(c), only when the low-pressure plug 3 is fitted into the high-pressure coupler 7, a flange 33 engages with an end portion of the high-pressure coupler 7 and the plug cannot be inserted any more. Therefore, the locking mechanisms 22 engage with the engaging portion 32 and cannot lock the low-pressure plug 3. As a result, the low-pressure plug 3 cannot be connected to the high-pressure coupler 7.

Therefore, in the third exemplary embodiment, the same advantages as those of the first exemplary embodiment can also be achieved.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2005-190416) filed on Jun. 29, 2005; the contents of which are incorporated herein by reference.

INDUSTRIAL APPLICABILITY

The present invention is applicable for a compressed air taking out apparatus that includes high-pressure and low-pressure couplers and high-pressure and low-pressure plugs in such a manner that the high-pressure plug can be connected to both couplers but the low-pressure plug can be connected only to the low-pressure coupler.

The invention claimed is:

1. A compressed air taking out apparatus comprising:
   a low-pressure coupler; a high-pressure coupler; and a plug,
   wherein each of the low-pressure coupler and the high-pressure coupler includes:
   a partition that partitions a supply side from which a compressed air is supplied and a receive side to which the compressed air is fed;
   a valve body for opening/closing an opening portion of the partition, arranged in the supply side of the partition, and urged in a direction to close the opening portion;
   a stem provided on the valve body and protruding to the receive side through the opening portion;
   a cylinder portion formed around the partition;
   a locking mechanism provided in a vicinity of an end portion of the cylinder portion and for stopping a movement of the plug; and
   a movable sleeve provided on an inside of the cylinder portion, having a projection portion on an inner surface, and capable of sliding in an axial direction,
   wherein the plug includes:
   a projecting surface that is capable of engaging with the projection portion; and
   an engaging portion that is capable of engaging with the locking mechanism wherein the cylinder portion includes a first cylinder portion and a second cylinder portion, the first cylinder portion is formed around the partition, the second cylinder portion is formed around the first cylinder portion, and the movable sleeve is arranged between the first cylinder portion and the second cylinder portion.

2. The compressed air taking out apparatus according to claim 1, wherein a distance between the locking mechanism and a top end of the stem in the high-pressure coupler is larger than a distance between the locking mechanism and a top end of the stem in the low-pressure coupler.

3. The compressed air taking out apparatus according to claim 1, wherein a distance between the locking mechanism and the projection portion of the movable sleeve in the high-pressure coupler is larger than a distance between the locking mechanism and the projection portion of the movable sleeve in the low-pressure coupler.

4. The compressed air taking out apparatus according to claim 1, wherein the plug has a flange that is capable of engaging with an end portion of the cylinder portion, and
   a distance between the locking mechanism and an end portion of the cylinder portion in the high-pressure coupler is larger than a distance between the locking mechanism and an end portion of the cylinder portion in the low-pressure coupler.

* * * * *